United States Patent [19]
Doyne

[11] 3,752,453
[45] Aug. 14, 1973

[54] PACKING MATERIAL UNIT
[75] Inventor: Richard F. Doyne, Summit, Ohio
[73] Assignee: The Ceilcote Company, Inc., Berea, Ohio
[22] Filed: Feb. 19, 1971
[21] Appl. No.: 117,028

[52] U.S. Cl. .................................. 261/94, 261/112
[51] Int. Cl. ................................................ B01f 3/04
[58] Field of Search ................. 261/94, 95, 98, 112

[56]     References Cited
       UNITED STATES PATENTS

| | | | |
|---|---|---|---|
| 1,480,463 | 1/1924 | Petzel | 261/95 |
| 1,796,501 | 3/1931 | Berl | 261/94 |
| 2,602,651 | 7/1952 | Cannon | 261/95 |
| 2,867,425 | 1/1959 | Teller | 261/95 |
| 2,949,934 | 8/1960 | Schrenk | 261/95 |
| 3,167,600 | 1/1965 | Worman | 261/94 |
| 3,266,787 | 8/1966 | Eckert | 261/94 |
| 3,618,910 | 11/1971 | Arndt | 261/94 |

FOREIGN PATENTS OR APPLICATIONS

| | | | |
|---|---|---|---|
| 93,843 | 3/1923 | Austria | 261/94 |
| 229,999 | 1/1911 | Germany | 261/95 |
| 768,316 | 2/1957 | Great Britain | 261/94 |
| 1,029,346 | 5/1958 | Germany | 261/94 |

OTHER PUBLICATIONS

Maspac Tower Packing Bulletin, Saran Lined Pipe Co., Ferndale, Mich., 261-295, 7-26-66, pp. 1-7.

*Primary Examiner*—Tim R. Miles
*Attorney*—Meyer, Tilberry & Body

[57]  ABSTRACT

A packing material unit for liquid-gas contact apparatus which is essentially six to 12 turns of a helix arranged about a circle and having the ends joined to form a torus. The helix comprises a filamentous material, and each loop of the helix is preferably or substantially circular. The loops carry one or more sharply defined surface interruptions in the form of abrupt nicks or projections, and preferably knobs and notches on exposed surfaces of the torus.

19 Claims, 12 Drawing Figures

PATENTED AUG 14 1973 3,752,453

INVENTOR.
RICHARD F. DOYNE
BY
Meyer, Tilbery & Body
ATTORNEYS.

PATENTED AUG 14 1973 3,752,453
SHEET 2 OF 2
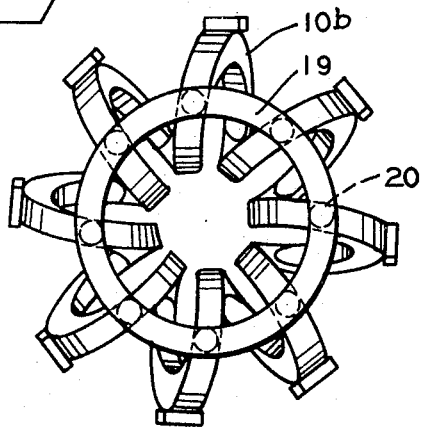
Fig. 6.
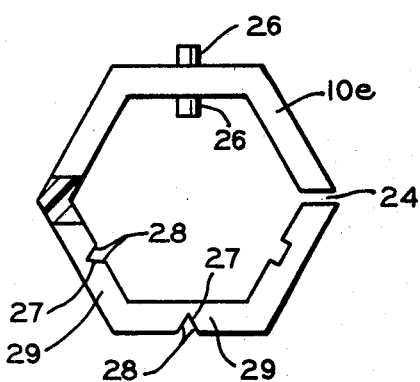
Fig. 10.
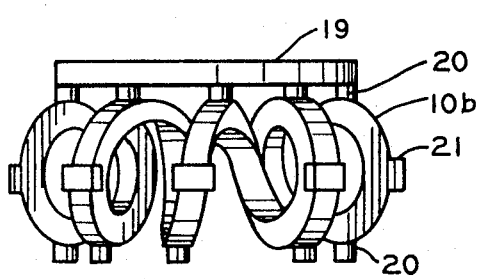
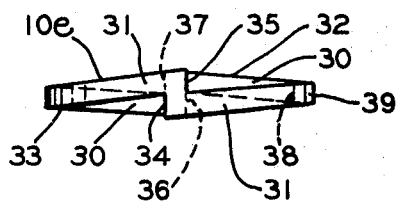
Fig. 12.
Fig. 7.
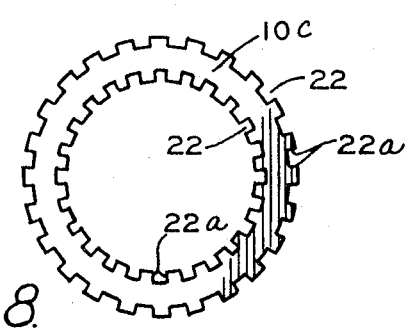
Fig. 8.
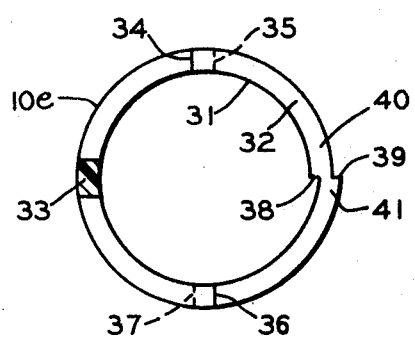
Fig. 11.
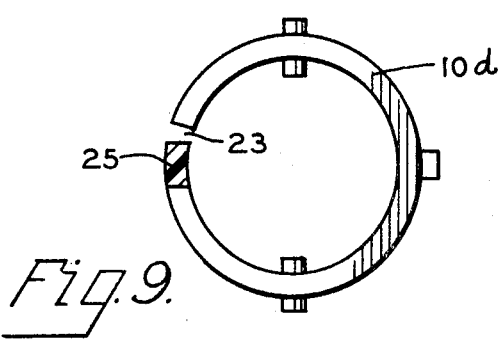
Fig. 9.
INVENTOR.
RICHARD F. DOYNE
BY
Meyer, Tilberry & Body
ATTORNEYS.

PACKING MATERIAL UNIT

This invention relates to packing units such as are used in air pollution control equipment, gas and liquid contact apparatus for absorption or desorption of gas, rectification columns, mist and entrainment separation of solid and liquid particulates, and the like.

These packing materials are known in various sizes and shapes, usually designed to bring two phases of a system, typically a gas or mist and a liquid, into intimate contact. Packing materials of a filamentous form are disclosed in the Teller U.S. Pat. No. 2,867,425, issued Jan. 6, 1959. Other packing configurations heretofore known are berl saddles and Raschig rings.

Packing materials work either by presenting an extended thin film of one phase, usually the liquid, to the other phase or by constantly renewing the surface of one phase, usually the liquid, so that the most efficient mass transfer between phases can occur with the least expediture of energy. In either case, however, the number of intersitial holdup points provided per cubic foot of packing is extremely important. These are points where the surface of one phase, usually the liquid, is renewed by agglomeration and redispersion, to provide a fresh unsaturated surface to the other phase. The other governing factor is the surface area of the packing.

Interstitial holdup points are provided both by the shape of the packing and by its intersections with the packing immediately surrounding it. Thus it is true that interlocking, by increasing the number of contact points between packing units, increases the number of interstitial holdup points, and this fact makes interlocking of packing units less objectionable than it was formerly considered, but interlocking still has disadvantages. Among these are the tendency interlocking has to block fluid flow and thus increase the pressure drop through the packed space, and the fact that extensive interlocking requires more packing units per cubic foot, which increases the weight and cost of large installations.

Interlocking can be prevented, and of course such prevention normally has the effect of reducing the number of interstitial holdup points. Thus, prevention of interlocking may not be desirable. What is needed is a packing unit which provides for reducing interlocking and at the same time advantageously provides a large number of interstitial holdup points, whereby reliance for such holdup points on contact with other packing units by interlocking is lessened. Such a packing unit would have the inherent capacity to provide better phase surface regeneration without being interlocked with other packing units, and would simultaneously require less pressure drop through the packed space, while increasing efficiency.

It is accordingly an object of this invention to provide a packing unit for liquid-gas contact apparatus by which more efficient operation of the apparatus is achieved while using fewer packing units per cubic foot.

Another object of the invention is to provide a packing material unit which provides for less interlocking with other packing units so as to require fewer units per cubic foot while simultaneously providing within each packing unit an increase in contact between the gas and liquid phases passing through the equipment.

A further object of this invention is to provide more interstitial holdup points, and thus better phase surface regeneration, in an individual piece of packing, thus reducing dependency on packing unit contact with surrounding or interlocked pieces of packing to achieve such holdup points.

Still another object of the invention is a packing unit which provides maximum time for mass transfer between the liquid phase on the one hand and the gas or mist phase on the other, by increasing within the unit itself the number of points of surface regeneration, which involves agglomeration and dispersion.

Yet another object of the invention is a packing unit which provides a longer retention time of the liquid phase passing through a liquid-gas contact apparatus while reducing the pressure drop in the gas phase through the apparatus.

By the present invention, a surface or surfaces of a packing unit are provided with sharply contoured projections or recesses which define abrupt interruptions to liquid flow along the surface and which reduce interlocking between adjacent units.

Such projections and recesses can be of any number of different structural configurations designed to achieve rapid breaking up of liquid flow contacting the projection or recess either as a result of impact therewith by dropping from a unit thereabove or by contact therewith during flow along the packing unit surface. For example, the projections can be cylindrical, square, rectangular, triangular, oval or diamond shaped in cross section. It is necessary that the projections or recesses define abrupt changes in the surface contour to cause immediate splitting or breaking of liquid impinging thereagainst to facilitate repid surface regeneration. Such splitting or breaking of liquid is to be clearly distinguished from unit surface configurations designed simply to increase surface area and spread or guide liquid flow relative to the surface. The concept of the present invention, is distinctively characterized by providing for more holdup points and at the same time more positive breaking of liquid flow whereby acceleration of surface regeneration is achieved and without the degree of interlocking heretofore required to achieve the number of holdup points.

Although applicable to any of the known packing unit configurations, such as the berl saddles and Raschig rings mentioned hereinabove, the invention is described herein in conjunction with a filamentous packing unit. Such a filamentous packing unit may be provided in any suitable configuration and is described herein in a preferred form which is a torus having six to twelve loops defined by a helix extending about an inner circle and having the free ends of the loops joined together. It will be appreciated too that the specific helix configuration described hereinafter is but one of many configurations of looped filamentous material which could be designed without departing from the basic configuration of a plurality of loops oriented about a central axis.

In the preferred packing unit configuration, each loop of the helix is a filament forming a substantially closed loop having a basic geometric configuration which is altered by abrupt projections and/or recesses in the configuration which effectively impede nesting or interlocking of packing units and define the holdup points thereof. In some units, an outer peripheral ring or rings extend about the torus each defining a closed loop of a filament and which closed loop or loops in turn may be provided with abrupt projections and/or recesses. The abrupt changes in the surface contour of the filaments of the preferred embodiment advantageously lend to the manufacture of a packing unit with thinner, more closely spaced filaments. In this respect, thinner filaments provide smaller targets for the inertial impactment of liquid or solid particulates from an airstream. A multitude of small targets are well established as providing better efficiencies in particulate removal. The preferred embodiment of this invention allows the interstitial or surface renewal points to be maintained for maximum gas absorption or desorption, while obtaining good efficiencies in particulate removal as well. Moreover, by reducing interlocking and compacting of the units, a reduction in pressure drop through a body of packing units is advantageously achieved.

The invention may take physical form in certain parts and arrangements of parts, preferred embodiments of which will be described in detail in this specification and illustrated in the accompanying drawings which form a part hereof and wherein:

FIG. 6 is a view similar to FIGS. 1 and 4 but showing still another embodiment of the invention.

FIG. 7 is a side elevation view of the embodiment shown in FIG. 6.

FIGS. 8, 9 and 10 are views similar to that of FIG. 3 but showing other forms and shapes which the individual loops of the torus may take in differing embodiments of the invention.

FIG. 11 is a side elevation of yet another form of an individual loop within the present invention.

FIG. 12 is a plan view of the loop shown in FIG. 11.

The packing units of the preferred embodiment of the present invention herein described are preferably produced from a material which is not wetted by the liquid employed in the system. Accordingly, many plastic materials are suitable for use in making the packing units. Preferably, polyethylene is employed. Polypropylene, polyvinyl chloride, chlorinated polyvinyl chloride, nylon, fluorocarbons and polystyrene are also suitable materials. Further, although plastic materials are preferable, metlas can be employed to produce packing units.

Figure 1:
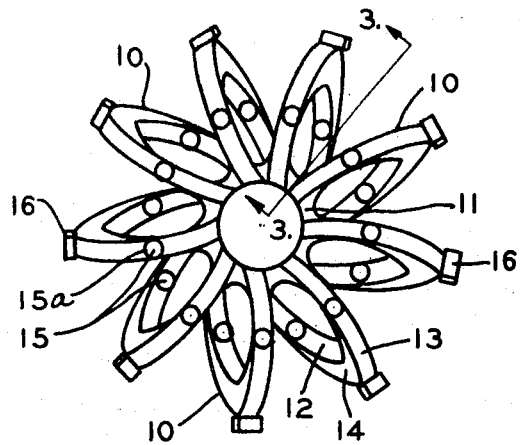
FIG. 1 is a top plan view of a packing unit made according to this invention.

The superior performance of packing units within the present invention is illustrated by the results of tests in which packing units of the character illustrated in FIG. 1 of the drawing were compared with the same size packing units, but not having the projections of applicant's units thereon. In the tests of each type unit, packing units were introduced into a packing container portion of a countercurrent Pilot Scrubber. Tests were run employing four rates of liquid flow and a wide range of gas flow rates for each liquid flow rate. More specifically, gas flow rates of from 500 lbs./hr./sq. ft. to 2,300 lbs./hr./sq. ft. were employed in conjunction with each of four liquid rates of 1,500, 2,500, 4,000 and 6,000 lbs./hr./sq. ft. Scrubbing liquid was used on a once-through basis and maintained at 77°F. The gas flow was ammonia-air and inlet and outlet concentrations were determined by wet chemical analysis. The results of the several tests disclose that: (1.) 25 percent less packing units with projections are required per cubic foot of packing space; (2.) A reduction of up to 30 percent in pressure drop is achieved using packing units with projections; (3.) Efficiency for both units under the same operating conditions is substantially the same, whereby the efficiency of a single packing unit with projections is approximately 25 percent greater than that of a unit without projections.

The results of the above tests demonstrate that considerable savings in the capital cost and the cost of operation of a packed separation unit can be readily achieved employing applicant's packing unit. In this respect, approximately 25 percent fewer units per cubic foot are required and the gas fan horsepower can be decreased in view of the lower pressure drop through the unit, all while achieving the same high level of efficiency previously obtainable.

The above benefits are derived by providing for the individual packing units to have sharply defined deviations from the surface conours thereof, which deviations function both to increase the number of holdup or drip-off points on the unit itself and reduce the amount of interlocking with an adjacent unit. Thus, in a given mass of such units, fluid flowing therethrough, influenced by gravity only and not by forced flow, impinges against an abrupt projection or recess and is immediately broken or diverted to leave one unit surface and drop to another surface of the one unit or a surface of another unit. Thus, rapid surface regeneration is advantageously realized. Moreover, the reduction in interlocking provides a less compact mass and thus desirably provides for less pressure drop of gas passed through the mass. Finally, the increase in holdup or drop-off points per unit together with the decrease in interlocking provide for separation apparatus operation with fewer packing units per cubic foot and at an efficiency equal to apparatus employing 25 percent more packing units of the same nominal size. When it is considered that 1,000 units of nominal 1 inch size without projections are required to fill one cubic foot of packing space, the savings realized by use of applicant's packing unit must be appreciated.

Figure 2:
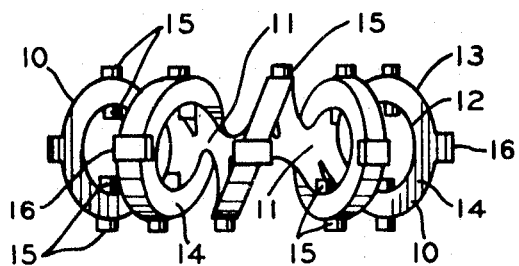
FIG. 2 is a side elevation view of the packing unit shown in FIG. 1.
Figure 3:
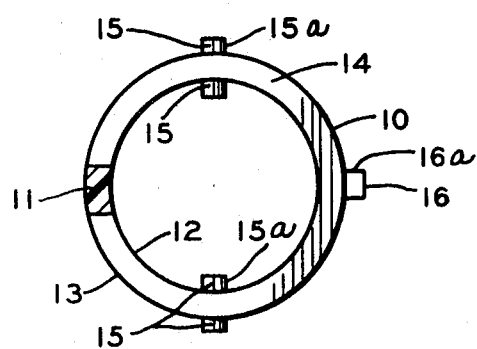
FIG. 3 is a view in section substantially on line 3—3 of FIG. 1.

Referring now to the drawings in greater detail wherein the showings are for the purpose of illustrating the preferred embodiments of the invention only and not for the purposes of limiting the same, FIGS. 1, 2 and 3 show a plurality of filament portions 10 each of which is substantially in the form of a loop having a basic geometric configuration, such as a circle. Preferably, six to 12 loops 10 are arranged about a central imaginary circle to form a figure which closely resembles a torus. More particularly, in a preferred embodiment of the invention, each of the filament portions 10 is a loop of a helix, the ends being joined together in areas 11 to form a continuous helix which gives the overall packing unit the appearance of a torus. In FIGS. 1, 2 and 3, the basic filament portions 10 have inner and outer peripheral surfaces 12 and 13, respectively, as well as opposed side surfaces 14. All of these surfaces have opposite ends meeting in areas 11 and each of the surfaces defines a flow path for liquid. The extent to which flow along any one of these surfaces is realized is, of course, dependent on the orientation of a given unit in a mass of units. One or more of surfaces 12, 13 and 14 is provided with at least one deliberate abrupt interruption disposed along the surface intermediate the opposite ends thereof, such as, for example, the substantially cylindrical projections 15 and rectangular projections 16. Preferably, projections 15 are positioned both on the inner peripheral surface 12 and outer peripheral surface 13 of each loop 10 and it will be noted that both projections 15 and 16 have corresponding wall portions 15a and 16a extending substantially perpendicular to the corresponding surface of the loop. A sharply defined junction is thus provided between the loop and projections. The abrupt interruption of the contour of surfaces 12 and 13 defined by the projections and corresponding loop surface has a distinct advantage over a large radius domed embossment or wave in the surface. In this respect, a droplet of water or other liquid flowing along a surface of a loop 10 toward a projection 15 or 16, or directly impacting against a projection 15 or 16 upon falling from a unit thereabove, will contact the projection and immediately be broken and given a new and abruptly different direction of flow relative to the initial direction of flow, rather than merely passing over or around the interruption if it were in the form of a wave or domed embossment.

Although projections 15 are illustrated in FIGS. 1, 2 and 3 to be disposed only at the upper and lower extremities of a loop 10 of a horizontally oriented packing unit and on inner and outer surfaces 12 and 13 of the loop, it will be appreciated that any number of projections may be positioned along the entire periphery of a given loop or loops of the unit and along the inside and/or the outside surface of the loop. Moreover, the projections may be plaed along the side surfaces of the loops.

It will be noted that the diameter of cylindrical projections 15 is substantially the same as the width of the corresponding loop surface. This assures that liquid flow along the loop surface will be broken and the liquid caused to leave the corresponding surface rather than to flow around the projection and rejoin on the other side thereof. This provides for more rapid surface regeneration by displacing the liquid from the original surface along which it was flowing.

The projections 16, mentioned above, are illustrated as being rectangular projections disposed at the radially outer extremities of loops 10 of a horizontally oriented packing unit. Projections 16, like projections 15, have sharply defined junctures with loops 10. In this embodiment of projections, the sides 16b of the projections extend beyond the corresponding side surfaces 14 of loops 10, whereby liquid flow along the outer surface of a loop 10 and around corresponding projection 16 and back onto the outer surface of the loop is prevented. It will be appreciated that rectangular projections 16 are another preferred form of projections which can be used with loops 10 either alone in the position illustrated, or in combination with projections 15. Moreover projections 16 can be used in place of cylindrical projections 15. Again, as with projections 15, projections 16 define abrupt changes in the surface contour which tend to break liquid flow to increase surface regeneration and at the same time serve to reduce interlocking of adjacent packing units. It will be further appreciated that projections 16 could function equally as well for these purposes if they were of a width substantially equal to the width of surface 13 of the loops.

Figure 4:
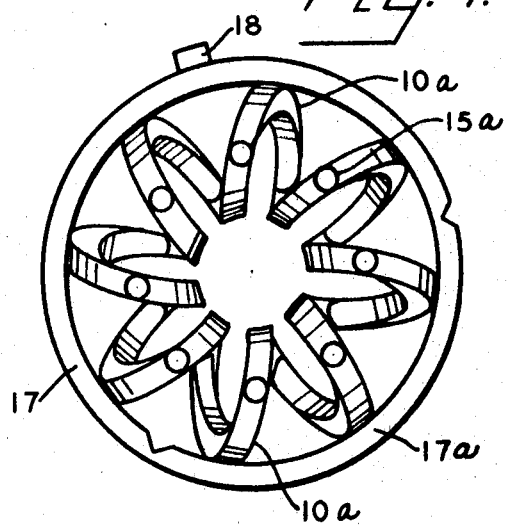
FIG. 4 is a view similar to that of FIG. 1 but showing another embodiment of the invention.
Figure 5:
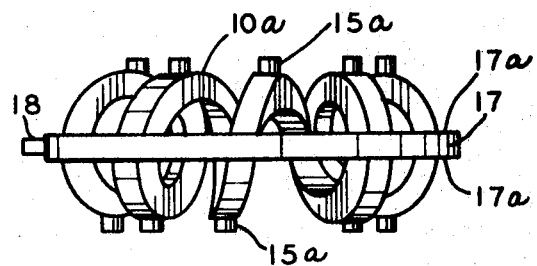
FIG. 5 is a side elevation view of the embodiment shown in FIG. 4.

As illustrated in FIGS. 4 and 5 of the drawing, a peripheral ring 17 may be provided about the packing unit loops. It will be noted in this embodiment that filament portions 10a are defined by a continuous filament which is helically wound to define the loops. Ring 17 is either integral with or is otherwise suitably connected to some or all of the loops, has wall portions 17a substantially perpendicular to the outer surfaces of the loops and defines for each loop a sharp interruption in the surface contour thereof. Thus ring 17 serves to break liquid flow in a manner similar to projections 15 and 16 and it will be readily appreciated that the ring greatly lessens interlocking of adjacent units. A similar ring could be disposed within the inner circle defined by the torus, alone or in combination with ring 17. Moreover, a ring or rings could be disposed within the annular space defined by the inner surfaces of the loops. Many modifications of the use of such a ring will be apparent from the foregoing description. Preferably, ring 17 or any other ring or combination of rings employed with the packing unit, is provided with projection means 18 which may be similar to and is for the same purpose as projections 15 and 16 described hereinabove. Moreover, filament portions 10a may be provided with projections 15a structurally similar to projections 15.

FIGS. 6 and 7 of the drawing illustrate a further embodiment of the use of a ring component with the packing unit similar to the unit in FIG. 1. In this instance a ring 19 is disposed about the top of the unit and is integrally or otherwise secured to projections 20 extending upwardly from the outer surfaces of the upper extremities of loops 10b which, in this embodiment are defined by a continuous helically wound filament. Projections 20 are similar to projections 15 and 16 described hereinabove. It will be appreciated that this disposition of a ring relative to the loops of the unit greatly lessens interlocking of adjacent units. Projections may be provided on the several surfaces of ring 19 similar to and for the same purpose as the projections 15 and 16 hereinbefore described. Further, projections 21 similar to projections 16 may be provided on loops 10b, as illustrated, or a ring similar to ring 17 could be provided to circumscribe the loops.

FIG. 8 illustrates a further embodiment of the present invention and, in this respect, discloses a loop 10c of the basic packing unit provided with sharply defined recesses 22 which abruptly interrupt the surface contour of the loop to define interruptions to liquid flow along the corresponding loop surface to achieve immediate breaking of flow and rapid surface regeneration. The recesses 22 may be provided in both the inner and outer surfaces of the loop, as illustrated in FIG. 8, or may be provided on either surface alone. Moreover, it will be appreciated that the recesses amy be provided in one or both of the side surfaces of the loops, and in any number desired along the lengths of the inner, outer and side surfaces. Still further, it will be appreciated that recesses of the character of recesses 21 may be employed in conjunction with any of the projections hereinbefore described and in any desired combination therewith. It will be noted too that the recesses are defined by walls 22a extending substantially perpendicular to the loop surfaces and that sharp edges are defined at the points of intersection of walls 22a with the corresponding loop surface. These sharply defined contours, as with the projections previously described, define sharp or abrupt deviations in the loop surface which enhance breaking liquid flow along the surface to achieve rapid surface regeneration and at the same time serve to deter interlocking.

With reference now in particular to loops 10, 10a and 10b of FIGS. 3, 5 and 7, respectively, each loop is a filament portion which in cross-section, in the preferred embodiment, is rectangular or substantially square. Each filament portion is substantially a loop having a basic circular configuration. These loops are considered to be substantially closed because of the junction in areas 11 of loops 10 and the close proximity of the radially inner ends of loops 10a and 10b. In FIGS. 9 and 10, however, gaps 23 and 24 are provided, respectively in loops 10d and 10e. For the purposes of the present invention, the loops shown in FIGS. 9 and 10 are substantially closed loops because the gaps 23 and 24 are not wide enough to permit passage through the gap of a filament of an adjacent packing unit, and thus the gaps cannot contribute to interlocking of adjacent packing units. Additionally, the location of the gap 23 in the loop 10d in FIG. 9 immediately adjacent to the point of attachment 25, by which the loop is secured to its adjacent loop, also contributes to the inability of gap 23 to permit interlocking of adjacent packing units. For that reason, the gap 23 shown in FIG. 9 could be wider than the gap 24 of FIG. 10 without permitting interlocking of adjacent packing units.

Each of the filament portions is a loop having a basic geometric configuration, as mentioned above. Thus, the filament portions shown in FIGS. 3, 8 and 9 are basically circles, while the filament portion of the embodiment shown in FIG. 10 is a substantially closed loop having a basic geometric configuration which is a hexagon. The filaments of these basic geometric configurations are provided with deliberate deviations from the basic configuration such as the previously described projections 15 and 16 and recesses 22. The gaps 23 and 24 also define deliberate sharp deviations which enhance surface regeneration. Still other deliberate deviations from the basic geometric configuration may be in the form of simple square projections such as that shown at 26 of FIG. 10, one of the projections 26 being inside the loop and the other projection 26 being on the external surface of the loop. Further deviations may be provided in the form of sharply defined V-shaped notches or recesses 27 illustrated in FIG. 10, which recesses have walls 28 extending perpendicular to loop surface 29.

In FIGS. 11 and 12 of the drawing there is disclosed a further embodiment of the present invention. In this respect, a loop 10e of a packing unit is illustrated which includes inner and outer peripheral surfaces 30 and 31 and side surfaces 32. All of these surfaces have opposite ends which meet in area 33 which designates the juncture between adjacent loops interconnected in the manner of the loops of FIG. 1. It will be understood, however, that the loops may be continuous as in the unit illustrated in FIG. 5, for example. Each of the surfaces 30, 31 and 32 defines a flow path for liquid. At least one of these surfaces is provided with a deliberate abrupt deviation intermediate the opposite ends thereof, and in this embodiment the deviation is a sharply defined offset formed by offsetting portions of the filament of the loop relative to one another either longitudinally of the loop axis, radially of the loop axis or longitudinally and radially of the loop axis. More particularly, portions of the filament of the loop at the top of the loop, for example, may be longitudinally offset to define abrupt deviations along surfaces 32, which abrupt deviations include wall means 34 and 35 extending substantially perpendicular to the corresponding surface 32. Similarly, portions of the bottom of the loop may be longitudinally offset relative to the loop axis to define abrupt deviations having wall means 36 and 37 extending substantially perpendicular to surfaces 32. It will be noted that the lower portions of the loop are offset longitudinally in opposite directions from the direction of offset of the top portions of the loop. It will be appreciated, however, that the offsets could be in the same direction longitudinally of the axis and could be provided at any desired location along the length of the filament.

The outer area of the filament of loop 10e is illustrated as having portions offset radially of the loop axis to define abrupt deviations in inner and outer surfaces 30 and 31 of the loop. These deviations include wall means 38 and 39 extending substantially perpendicular to inner and outer surfaces 30 and 31 of the loop, respectively. It will be noted that the offset of the outer portion of the loop is less than the full thickness of the filament, while the offsets at the top and bottom of the loop are illustrated as being the full thickness of the filament material. This is illustrative of the fact that the offset can be to any desired degree relative to the thickness of the loop filament. Moreover, a given offset can be both longitudinal and radial relative to the loop axis. Thus, loop portions 40 and 41 might well be longitudinally offset as well as radially offset in the manner illustrated. Similarly, the upper and lower loop offsets could well be radially offset together with the longitudinal offset illustrated.

Abrupt deviations in the form of sharply defined offsets provide the desirable hold up points on a packing unit provided therewith and further advantageously provide interruptions in the otherwise smooth surface which serve to reduce interlocking of adjacent units.

It will be appreciated that the loop 10e can also be provided with projections or recesses of the character described hereinbefore and that the other packing unit embodiments described herein can be provided with offsets of the character herein described. Further, in those embodiments of packing units wherein an annular ring is disposed about the outer periphery of the loops, about the inner periphery of the loops, or is otherwise associated with the loops, such ring may advantageously be provided with offset portions of the character described in conjunction with this embodiment.

The invention has been described with reference to the preferred embodiments. Obviously, modifications and alterations will occur to others upon the reading and understand of this specification. It is my intention to include all such modifications and alterations insofar as they come within the scope of the appended claims or the equivalence thereof.

What is claimed is:

1. A packing material unit for liquid-gas contact apparatus, said unit including a plurality of elongated filament portions of narrow width and thickness relative to the length thereof, said filament portions having opposite ends and having narrow elongated surfaces between said opposite ends defining flow paths for liquid, at least one of said surfaces having an abrupt deviation intermediate the opposite ends thereof and transverse to the direction therebetween, said deviation including surface means continuous with said one surface in said direction and having opposite sides substantially perpendicular to said one surface and intersecting said one surface at spaced locations in said direction, whereby said deviation abruptly interrupts the contour of said one surface to define a hold-up point by which liquid on said one surface is displaced therefrom.

2. A packing unit as in claim 1, in which said deviation is a sharply defined recess in said one surface.

3. A packing unit as in claim 1, in which said deviation is a sharply defined projection extending outwardly from said one surface.

4. A packing unit as in claim 3, in which said filament is substantially square in cross-section and said projection has a width greater than the width of said one surface.

5. A packing unit as in claim 1, wherein a second of said surfaces of said filament portions is provided with at least one abrupt deviation, said one deviation including surface means continuous with said second surface in the direction between the opposite ends of said second surface and having opposite sides substantially perpendicular to said second surface and intersecting said second surface at spaced locations in said direction, whereby said one deviation abruptly interrupts the contour of said second surface to define a hold-up point by which liquid on said second surface is displaced therefrom.

6. A packing unit as in claim 8, in which said abrupt deviation and said one abrupt deviation are sharply defined projections extending outwardly from the corresponding one of said one and second surfaces.

7. A packing unit as in claim 5, in which said abrupt deviation and said one abrupt deviation are sharply defined recesses.

8. A packing unit as in claim 5, in which one of said abrupt deviation and said one abrupt deviation is a sharply defined projection and the other is a sharply defined recess.

9. A packing material unit for liquid-gas contact apparatus comprising a plurality of elongated filament portions each substantially in the form of a loop, said loops being disposed in a circular pattern about an axis, each of said loops having narrow inner and outer peripheral surfaces defining flow paths for liquid, at least one of said surfaces of each of said loops having at least one abrupt deviation including surface means continuous with said one surface in the peripheral direction thereof and having opposite sides substantially perpendicular to said one surface and intersecting said one surface at peripherally spaced locations therealong, whereby said deviation abruptly interrupts the contour of said one surface to define a hold-up point by which liquid flowing on said one surface is displaced therefrom.

10. A packing unit as in claim 9, wherein said deviation in said one surface is a sharply defined recess.

11. A packing unit as in claim 9, wherein said abrupt deviation is an annular filament extending about said axis and being interconnected with at least one of said loops.

12. A packing unit as in claim 9, wherein said deviation in said one surface is a sharply defined porjection extending outwardly from said one surface.

13. A packing unit as in claim 12, and a filament ring interconnected with the outer surface of at least one of said loops.

14. A packing unit as in claim 12, wherein the other of said surfaces of each of said loops has at least one abrupt deviation therein, said one abrupt deviation including surface means peripherally continuous with said other surface and having opposite sides substantially perpendicular to said other surface and intersecting said other surface at peripherally spaced locations therealong, whereby said one deviation abruptly interrupts the contour of said other surface.

15. A packing unit as in claim 14, wherein said deviation in said other of said surfaces is a sharply defined projection extending outwardly from said other surface.

16. A packing material unit for liquid-gas contact apparatus comprising a plurality of elongated filament portions each substantially in the form of a loop, said loops being disposed in a circular pattern about an axis and having inner ends extending generally toward said axis and interconnected, whereby said loops together resemble a torus, each of said loops having narrow inner and outer peripheral surfaces defining flow paths for liquid, said inner and outer surfaces of at least one of said loops each having at least one abrupt deviation including surface means continuous with the corresponding one of said inner and outer surfaces in the peripheral direction thereof and having opposite sides extending substantially perpendicular to the corresponding surface and intersecting said corresponding surface at peripherally spaced locations therealong, whereby said deviation abruptly interrupts the contour of said corresponding surface to define a holdup point by which liquid flowing on said corresponding surface is displaced therefrom.

17. A packing unit as in claim 17, wherein said deviations on said inner and outer surfaces are sharply defined projections extending outwardly from the corresponding one of said inner and outer surfaces.

18. A packing unit as in claim 17, wherein said projections are generally parallel to said axis.

19. A packing unit as in claim 18, and a filament ring interconnected with the outer surfaces of at least one of said loops.

* * * * *